June 4, 1963  ZENMARO HOSOKAWA  3,092,075
REVOLVING ANNULAR HEN HOUSE
Filed Aug. 17, 1961
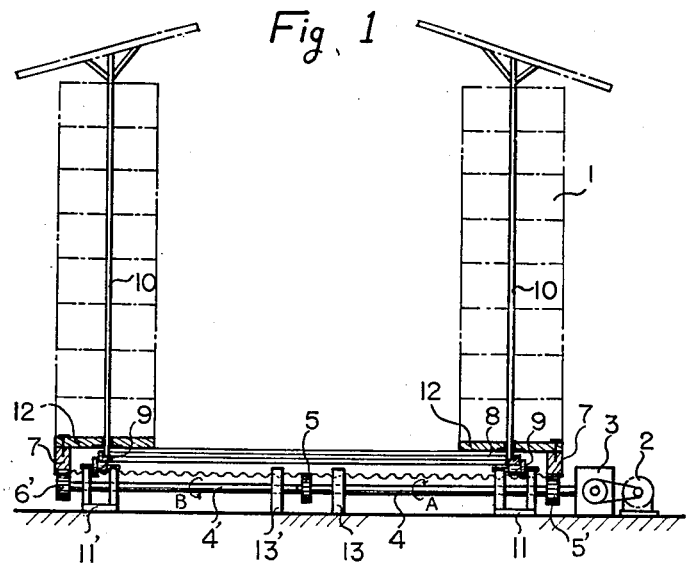
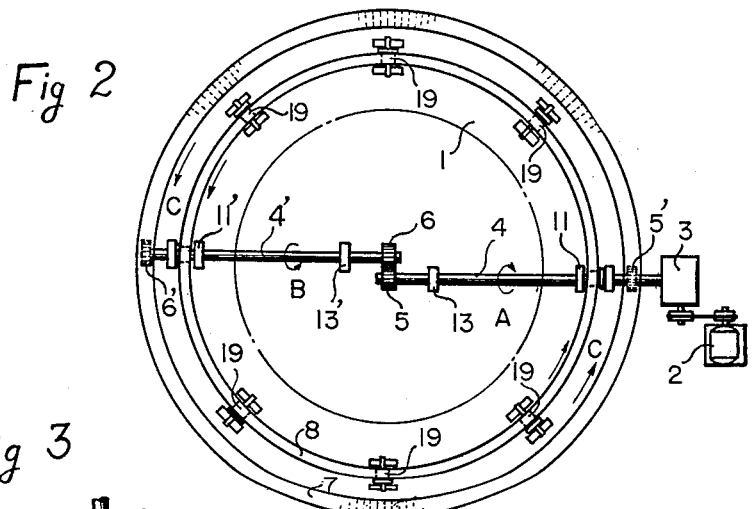
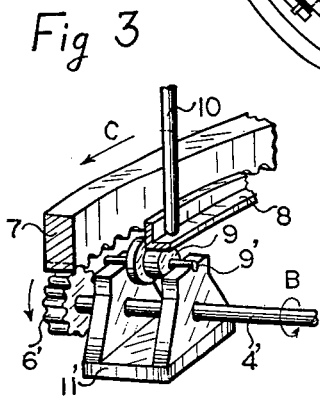
INVENTOR.
ZENMARO HOSOKAWA
BY Blum, Moscovitz,
Friedman and Blum
Attorneys United States Patent Office 3,092,075
Patented June 4, 1963

3,092,075
REVOLVING ANNULAR HEN HOUSE
Zenmaro Hosokawa, Kawasaki-shi, Japan, assignor to Nippon Reizo Kabushiki Kaisha, Tokyo, Japan
Filed Aug. 17, 1961, Ser. No. 132,127
3 Claims. (Cl. 119—15)

This invention relates to an improvement in a revolving hen-house and particularly to a driving mechanism for such a revolving hen-house.

Heretofore, a hen-house stands still. It is not intensive enough.

One object of this invention is to provide a revolving hen-house which is further intensive than the known hen-house.

Another object of this invention is to provide a revolving hen-house in which hens lay more and more.

Still another object of this invention is to provide a revolving hen-house which is driven without a disturbance of egg-laying.

Further another object of this invention is to provide a revolving hen-house which may be built and driven inexpensively.

Briefly stated in accordance with one aspect of this invention, there is provided a revolving hen-house comprising a driving mechanism. The driving mechanism comprises two gears arranged at ends of a diameter of a circle and adapted to rotate in the opposite direction with each other by a prime mover, an outer ring adapted to revolve above the circle by the gears, an inner ring adapted to revolve on a plurality of rollers arranged concentrically with the outer ring, and an annular floor secured to the outer ring and the inner ring concentrically with each other, on which a plurality of cages is piled upon. In the cages hens are raised, respectively.

The invention will be better understood and other objects and additional advantages of the invention will become apparent upon perusal of the following description taken in connection with the drawings, and the scope of the invention will be defined in the appended claims.

In the drawings,

FIG. 1 is a sectional elevation of a revolving hen-house embodying the principles of this invention;

FIG. 2 is a plan view of the supporting and drive means thereof; and

FIG. 3 is a fragmentary perspective view of a part of a driving mechanism for the hen-house.

Referring more particularly to the drawings, the preferred embodiment of this invention will now be described; however, this description will be understood to be illustrative of the invention and not as limiting it to the particular construction shown and described. An electric motor 2 is provided having a reduction gear 3. A shaft 4 of the reduction gear 3 is extended rotatable through a bearing stand 11 and an inner bearing stand 13. Another shaft 4' is arranged in parallel to the first-named shaft 4 and journaled by a bearing stand 11' and an inner bearing stand 13'. A gear 5 is mounted on the shaft 4 at its inner end and the same gear 6 is mounted on the shaft 4' at its inner end and adapted to engage with the gear 5 so as to rotate the shaft 4' oppositely to the shaft 4. Another gear 5' is mounted on the shaft 4 between the reduction gear 3 and the bearing stand 11. A gear 6' same with the gear 5' is mounted on the shaft 4' at the outer end thereof so as to rotate the gear 6' oppositely to the gear 5'. There is an annular rack 7, fixed to floor 12 and depending therefrom. The teeth of rack 7 are meshed with the gears 5' and 6'. An annular floor 12 is secured to and set on the top of the rack 7. A plurality of vertical posts 10 are secured to and extended downwards through the annular floor 12 to an annular track 8. The bearing stands 11 and 11' have flanged rotatable rollers 9 having radial shafts 9' rotatable in radially spaced and aligned bearing grooves formed in the upper surfaces of the bearing stands 11, 11'. The shafts 9' are secured in the grooves by gravity. A plurality of auxiliary bearing stands having similar rotatable rollers 19 are arranged circularly together with the bearing stands 11 and 11' so as to set the annular track 8 revolvably thereon. Thus the assembly composed of the rack, the annular floor, and the annular track is carried by the rollers 9 of bearing stands 11 and 11' and auxiliary bearing stands and made revolvable by means of the gears 5' and 6'. A plurality of cages 1 are piled upon the annular floor 12 and supported by the posts 10. A ring roof is supported by the posts on their tops.

In operation, the electric motor 2 drives the shaft 4 as shown by an arrow A whereby the shaft 4' is driven as shown by another arrow B. Therefore the annular rack 7 is driven as shown by arrows C in FIG. 2. Therefore, the cages piled upon the annular floor 12 are revolved slowly at will so that the cages sun themselves uniformly and are made breezy suitably.

While a particular embodiment of the invention has been illustrated and described, modifications thereof will readily occur to those skilled in the art. It should be understood therefore that the invention is not limited to the particular arrangement disclosed but that the appended claims are intended to cover all modifications which do not depart from the true spirit and scope of the invention.

What is claimed as new and desired to be secured by Letters Patent of the United States is:

1. In a revolving hen house including an annular floor and a plurality of cages supported thereon; the improvement comprising an annular rack fixed to said floor and depending therefrom, an annular track rail fixed to said floor and depending therefrom concentrically inwardly of said rack, a plurality of rollers supporting said track and floor means mounting said roller in an annular series, at least one spur gear, means mounting said gear in meshing relation to said rack, and power means for driving said spur gear engaged therewith.

2. In a revolving hen house including an annular floor and a plurality of cages supported thereon; the improvement comprising an annular rack fixed to said floor and depending therefrom, an annular track rail fixed to said floor and depending therefrom in inwardly spaced concentric relation to said rack, an annular series of fixed bearing stands below said track, at least one flanged roller rotatably mounted on each stand and rollably engaging said track to provide an antifriction support for the same and said floor, at least one drive shaft rotatably mounted in one of said bearing stands, a spur gear fixed to said drive shaft in meshing relation to said rack for revolving the same and said floor, and power means for rotating said drive shaft.

3. In a revolving hen house including an annular floor and a plurality of cages supported thereon; the improvement comprising an annular rack fixed to said floor and depending therefrom, an annular track rail fixed to said floor and depending therefrom in inwardly spaced concentric relation to said rack, an annular series of fixed bearing stands below said track, each stand having radially spaced upper edges formed with radially aligned bearing grooves, a flanged roller including radially oppositely directed stub shafts rotatably supported by gravity in said grooves, said rollers supporting said track thereon, a pair of drive shafts disposed in offset parallel relation and extending substantially radially inwardly of said rack in opposite directions, a spur gear on each shaft in meshing relation to drive said shafts in opposite directions, means rotatably mounting said shafts in two substantially oppositely disposed bearing stands, said shafts having extensions projecting outwardly of such bearing stands, drive gears fixed to said shaft extensions in meshing relation to said rack to revolve the same and said floor, and drive means for rotating one of said shafts.

References Cited in the file of this patent

UNITED STATES PATENTS

| | | |
|---|---|---|
| 889,371 | Hawley | June 2, 1908 |
| 2,969,040 | Siptrott | Jan. 24, 1961 |
| 3,018,759 | Helbig | Jan. 30, 1962 |

FOREIGN PATENTS

| | | |
|---|---|---|
| 117,578 | Germany | Feb. 8, 1901 |
| 368,581 | Germany | Feb. 7, 1923 |